United States Patent
Liu et al.

(10) Patent No.: US 8,190,654 B2
(45) Date of Patent: May 29, 2012

(54) BULK SELECTION ELECTRONIC TOOL

(75) Inventors: Christina Kaing Liu, San Bruno, CA (US); George Brad, Bucharest (RO); Radu Galesanu, Bucharest (RO); Rodney Resella, San Bruno, CA (US); Raluca Rosca, Bucharest (RO); Andrew David Simchik, San Bruno, CA (US); Christian Andrew Williams, San Bruno, CA (US)

(73) Assignee: Vendio Services, Inc., San Mateo, CA (US)

( * ) Notice: Subject to any disclaimer, the term of this patent is extended or adjusted under 35 U.S.C. 154(b) by 1570 days.

(21) Appl. No.: 11/112,872

(22) Filed: Apr. 21, 2005

(65) Prior Publication Data
US 2010/0049764 A1 Feb. 25, 2010

Related U.S. Application Data

(60) Provisional application No. 60/586,559, filed on Jul. 9, 2004.

(51) Int. Cl.
*G06F 17/30* (2006.01)
*G06F 17/00* (2006.01)
*G06Q 30/00* (2012.01)

(52) U.S. Cl. ........ 707/805; 707/694; 707/792; 707/803; 705/26.1; 705/27.2

(58) Field of Classification Search .................. 707/609, 707/648, 651, 705–712, 758, 769–770, 779–780, 707/786, 790, 797–798, 829, 600, 694, 754, 707/776, 792, 803, 805; 700/36; 705/26–27, 705/22, 27.2; 709/215–220; 715/243, 234; 706/45–50

See application file for complete search history.

(56) References Cited

U.S. PATENT DOCUMENTS

| | | | | |
|---|---|---|---|---|
| 5,272,628 A | * | 12/1993 | Koss | 715/205 |
| 6,151,608 A | * | 11/2000 | Abrams | 707/679 |
| 6,167,382 A | * | 12/2000 | Sparks et al. | 705/26 |
| 6,324,534 B1 | * | 11/2001 | Neal et al. | 1/1 |
| 6,411,960 B1 | * | 6/2002 | Fisher | 1/1 |

(Continued)

FOREIGN PATENT DOCUMENTS

EP 0855687 * 7/1998

(Continued)

OTHER PUBLICATIONS

Wei-Po Lee et al. "Intelligent agent-based systems for personalizd recommendations in Internet commerce", Expert Systems with Applications 22 (2002) 275-284.*

*Primary Examiner* — Srirama Channavajjala
(74) *Attorney, Agent, or Firm* — Shiells Law Firm P.C.; Theodore F. Shiells (57) ABSTRACT

A method is provided wherein at least one established group of details with associated policies is created. Profiles with profile macros are selected and a matrix of fields may be derived from the group(s) and populated. A bulk subset of the matrix may be selected according to search criteria and edits applied to a source dataset selected from the bulk subset to generate a destination dataset, wherein the edits are constrained by the set of associated policies. The invention may be performed over a global electronic network (especially the Internet) in a manner that complies with the effective policies at multiple destination sites.

22 Claims, 7 Drawing Sheets

U.S. PATENT DOCUMENTS

| | | | |
|---|---|---|---|
| 6,571,216 B1* | 5/2003 | Garg et al. | 705/14.25 |
| 6,625,581 B1* | 9/2003 | Perkowski | 705/27.1 |
| 6,910,187 B2* | 6/2005 | Felkey et al. | 715/733 |
| 7,080,070 B1* | 7/2006 | Gavarini | 1/1 |
| 7,299,240 B1* | 11/2007 | Crozier | 1/1 |
| 2002/0138357 A1* | 9/2002 | Dutta | 705/26 |
| 2002/0194196 A1* | 12/2002 | Weinberg et al. | 707/104.1 |
| 2003/0105682 A1* | 6/2003 | Dicker et al. | 705/27 |
| 2003/0114950 A1* | 6/2003 | Ruth et al. | 700/108 |
| 2003/0120528 A1* | 6/2003 | Kruk et al. | 705/7 |
| 2003/0139827 A1* | 7/2003 | Phelps | 700/36 |
| 2003/0140100 A1* | 7/2003 | Pullara | 709/203 |
| 2004/0054625 A1* | 3/2004 | Kellogg et al. | 705/41 |
| 2004/0059614 A1* | 3/2004 | Brown et al. | 705/8 |
| 2005/0010485 A1* | 1/2005 | Sarvestani et al. | 705/26 |
| 2005/0021513 A1* | 1/2005 | Vedula et al. | 707/3 |
| 2005/0289081 A1* | 12/2005 | Sporny | 705/64 |
| 2007/0150376 A1* | 6/2007 | Muller | 705/27 |

FOREIGN PATENT DOCUMENTS

| | | |
|---|---|---|
| WO | WO 97/42589 | * 11/1997 |

\* cited by examiner

Manage Profiles

Listing profiles are stored sets of listing parameters that can help you save time. The profiles you define here can be used during the listing creation process to pre-fill all your listing details and eliminate redundant data entry.

Edit the names and summaries of your profiles below. Click New to create a new profile based on your Global Preferences. Select a profile and click Edit to change it's settings. Click Save when you're done.

Profiles-Showing 1 to 5 of 5 profiles

[New] [Done] [Edit] [Delete]

| | Profile Name | Summary | Defa |
|---|---|---|---|
| ☐ | DefaultVendio Profile | Select this profile to apply your Global Preference settings | ● |
| ☐ | International Shippment | Use this profile for shipping internationally | ○ |
| ☐ | PayPal Only | Use this profile for PayPal Only | ○ |
| ☐ | AllPayments Accepted | This profile accepts ALL payments | ○ |
| ☐ | 10 Day, Auto-Relist, Recurring | This profile sets a 10 day auctions with Auto Relist and Recurrance | ○ |

[New] [Done] [Edit] [Delete]

[Done]

Tickets Listing Data

| Event/Location/Date | Seating | Profile | Title | Subtitle | Listing Type | Starting Bid | Item Specific | BIN/Fixed | Reserved | Start Time | Duration | Preview |
|---|---|---|---|---|---|---|---|---|---|---|---|---|
| Ozzfest<br>Tweeter Center-MA<br>Mansfield, Massachusetts<br>Jul 12, 2004, 9:00 am | Sec.<br>Row<br>Seats | Default<br>Vendio<br>Profile | - TICKETS<br>for Ozzfest<br>on 7/12 | none | Auction | 0.99 | | none | none | Save to<br>Pending | 7 days | Preview |
| Tchaikovsky Spectacular<br>Hollywood Bowl<br>Los Angeles, California<br>Aug 13, 2004, 8:30 pm | Sec.<br>Row<br>Seats | Default<br>Vendio<br>Profile | - TICKETS<br>for<br>Tchaikovsky<br>Spectacular<br>on 8/13 | none | Auction | 0.99 | | none | none | Save to<br>Pending | 7 days | Preview |
| | Sec.<br>Row<br>Seats | Default<br>Vendio<br>Profile | - TICKETS<br>for<br>Tchaikovsky<br>Spectacular<br>on 8/13 | none | Auction | 0.99 | | none | none | Save to<br>Pending | 7 days | Preview |
| | Sec.<br>Row<br>Seats | Default<br>Vendio<br>Profile | - TICKETS<br>for<br>Tchaikovsky<br>Spectacular<br>on 8/13 | none | Auction | 0.99 | | none | none | Save to<br>Pending | 7 days | Preview |
| | Sec.<br>Row<br>Seats | Default<br>Vendio<br>Profile | - TICKETS<br>for<br>Tchaikovsky<br>Spectacular<br>on 8/13 | none | Auction | 0.99 | | none | none | Save to<br>Pending | 7 days | Preview |

Figure 6

Tickets Listing Data

| Event/Location/Date | Seating | Profile | Title | Subtitle | Listing Type | Starting Bid | BIN/Fixed? | Reserve? | Start Time | Duration | Preview |
|---|---|---|---|---|---|---|---|---|---|---|---|
| Ozzfest Tweeter Center-MA Mansfield, Massachusetts Jul 12, 2004, 9:00 am | Sec. Row Seats | Default Vendio Profile | -TICKETS for Ozzfest on 7/12 | none | Auction | 0.99 | 2.50 | none | Save to Pending | 7 days | Preview |
| Tchaikovsky Spectacular Hollywood Bowl Los Angeles, California Aug 13, 2004, 8:30 pm | Sec. Row Seats | Default Vendio Profile | -TICKETS for Tchaikovsky Spectacular on 8/13 | none | Auction | 0.99 | none | none | Save to Pending | 7 days | Preview |
| | Sec. Row Seats | Default Vendio Profile | -TICKETS for Tchaikovsky Spectacular on 8/13 | none | Auction | 0.99 | none | none | Save to Pending | 7 days | Preview |
| | Sec. Row Seats | Default Vendio Profile | -TICKETS for Tchaikovsky Spectacular on 8/13 | none | Auction | 0.99 | none | none | Save to Pending | 3 days | Preview |
| | Sec. Row Seats | Default Vendio Profile | -TICKETS for Tchaikovsky Spectacular on 8/13 | none | Auction | 0.99 | none | 0.50 | Save to Pending | 7 days | Preview |

Figure 7

BULK SELECTION ELECTRONIC TOOL

RELATED APPLICATIONS

The application claims the benefit of U.S. Provisional Patent Application No. 60/586,559 filed Jul. 9, 2004 having at least common inventor Liu.

FIELD OF THE INVENTION

The invention generally relates to computer based data management systems. The invention more particularly comprises methods and systems for generation and editing of datasets such as, for example, electronic commerce oriented datasets for human interaction.

BACKGROUND OF THE INVENTION

Internet based E-commerce has been booming in recent years and usage is commonplace. Complex pricing mechanisms including various types of auctions have found popularity. Especially with volatile merchandise, a need has become apparent for good automation of the activity of making offers for sale. In particular the need to minimize repetitive editing of catalogs and other sales data is apparent, especially to allow the sales activity to be responsive to rapidly changing trading conditions.

SUMMARY

Accordingly, an aspect of the invention includes methods of mapping structured source data to structured destination data in bulk. Such mapping may be Internet based and cross-platform/cross-browser and thus need not require installation of any particular system components on the client desktop and need not require client intervention for enablement.

Such mapping may enable compliance with the policies of multiple destination sites, such as electronic commerce virtual web sites and may include data validation against appropriate destination sites' policies.

Such mapping may further enable updating of mutually correlated sets of source data elements to destination data element and may further aggregate source data such as by common attributes thereby allowing bulk editing as a prelude to introduction of destination data instances.

According to a further aspect of the invention, a further method may use a dynamic matrix thus enabling rapid and highly automated, creation and editing of structured datasets. Such a matrix may present a structured interface that enables multiple data elements to be concurrently presented, and edited either singly, per dataset, or in bulk selections. Such a matrix need not require installation of any particular system components on the client desktop and need not require client intervention during routine operation.

According to a still further aspect of the invention, an inventive method may be performed over a global electronic network (especially the Internet) in a manner that complies with the latest commercial and/or technical policies at a one or more destination sites.

According an aspect of the invention, a method is provided wherein at least one established group of details with associated policies is created. Profiles with profile macros are selected and a matrix of fields is derived from the group(s) and populated. A bulk subset of the matrix may be selected according to search criteria and edits applied to a source dataset selected from the bulk subset to generate a destination dataset, wherein the edits are constrained by the set of associated policies.

According to a still further aspect of the invention, a computer software product is provided which provides a convenient means for use of the invention and its methods.

According to still further aspects of the invention a variety of enhancements may be used.

BRIEF DESCRIPTION OF THE DRAWINGS

The accompanying drawings, which are incorporated in and constitute a part of the specification, illustrate an embodiment of the invention, and, together with the description, serve to explain the principles of the invention:

FIG. 6 shows an exemplary matrix with populated fields according to an embodiment of the invention.

For convenience in description, identical components have been given the same reference numbers in the various drawings.

DETAILED DESCRIPTION OF THE PREFERRED EMBODIMENTS

In the following description, for purposes of clarity and conciseness of the description, not all of the numerous components shown in the schematics and/or drawings are described. The numerous components are shown in the drawings to provide a person of ordinary skill in the art a thorough, enabling disclosure of the present invention. The operation of many of the components would be understood and apparent to one skilled in the art.

Although the invention is described in terms of ticket sales for events such as performance events, the term event can be construed more generally. The invention may apply to anything suitable for commercial handling and which may be represented by paperwork. For example not just the vending of space, such as performance events and "seats" on a travel vehicle, but also any merchantable valuable consideration claimed by presenting a ticket, or even real estate. Considering real estate for a moment, from a practical standpoint (though not necessarily a legal standpoint) most of the commerce activity is in the generation and handling of paperwork—the good earth is not delivered to the buyer, nor does the buyer necessarily relocate to the land.

Inventive methods disclosed herein may, for example, use a dynamic matrix to enable rapid, highly automated, determination of product attributes such as over a global electronic network. The method may be useful for the bulk identification of attributes for items that share some, but not all, attribute values and in other ways.

The invention will now be described in exemplary general terms, followed by more specific examples of particular embodiments direct at particular applications. The following acts as may be used in whole or part in embodiments of the invention described in more detail infra.

Figure 1:
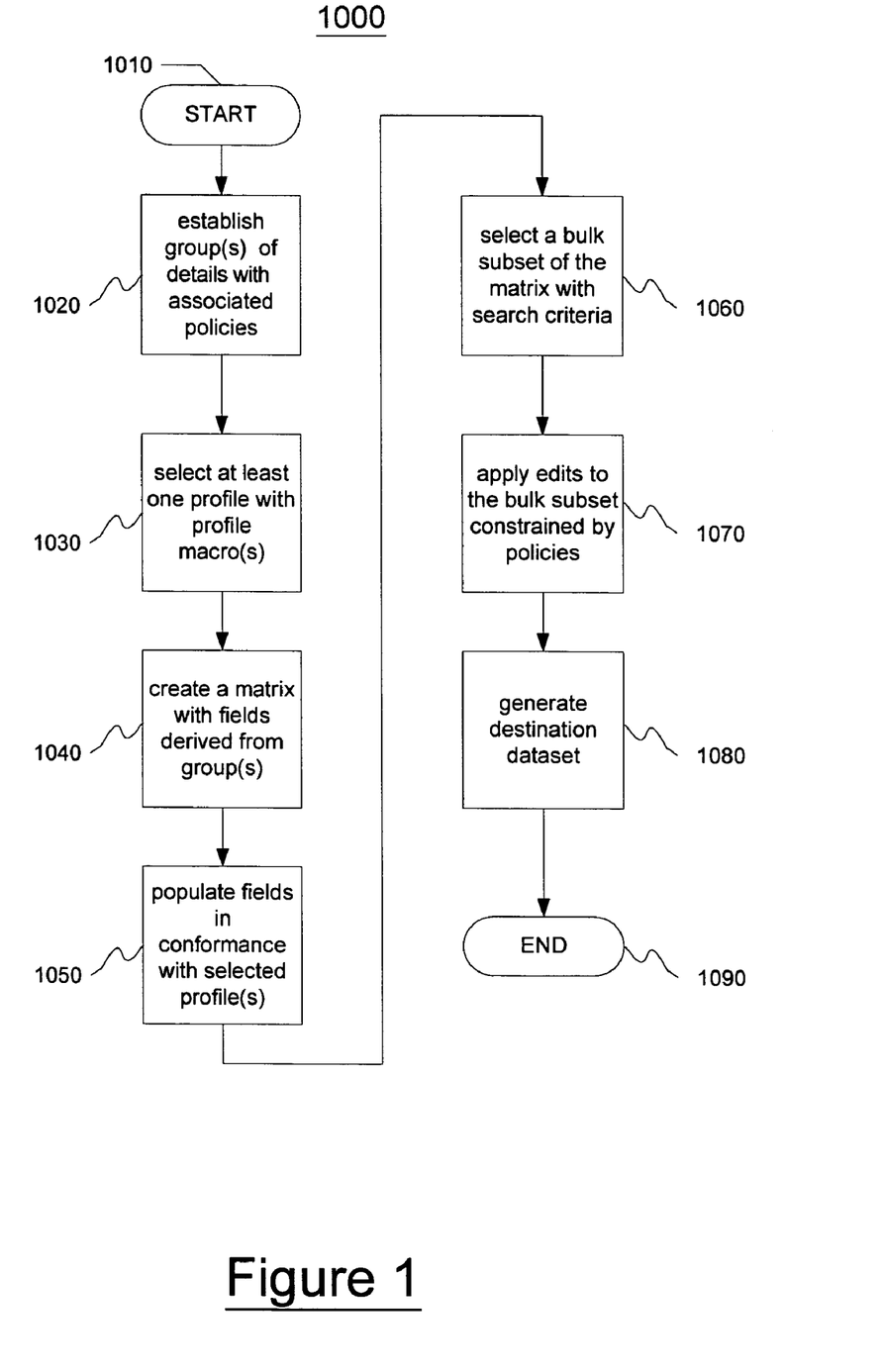
FIG. 1 depicts a flowchart of a software implementation according to a preferred embodiment of the invention.

Referring to FIG. 1 which depicts a flowchart of a software implementation according to a preferred embodiment of the invention, a series of acts 1000 which may be collected into steps are disclosed. In box 1010 the method for processing data starts.

Still referring to FIG. 1, in box 1020 at least one group of details is established. These group(s) of details each have a set of associated policies. Groups of details with associated policies are well known in the commercial data processing arts.

Next, in box 1030, at least one selected profile is selected. Profiles used in this manner are typically implemented as profile macros. In alternative embodiments, templates may be used instead of, or in addition to, profiles with profile macros.

Next, in box 1040, a matrix is created. Typically this matrix comprises a number of fields that are derived from fields defined by the group(s) of details (with their associated policies). It may not be crucial to the method how these fields are selected but see infra for an example.

Then, in box 1050, the fields in the matrix are populated with data from a data source (not shown in FIG. 1). The populating of these fields conforms to and is constrained by the selected profile(s) (or template(s)).

In box 1060, a bulk subset of the matrix is selected according to at least one search criterion. Typically this will be some humanly intelligible subset of the matrix sharing some common entity. For example, where the matrix is represented in graphical form on one or more images for a display screen the entities might be selected as those displayed within a rectangular area on that screen.

In box 1070, a number of edits may be applied to a source dataset selected from the bulk subset of the matrix. The edits will typically be constrained and/or guided by the set(s) of policies associated with the group(s) of details. This may generate a destination dataset (box 1080). Finally in box 1090 the method ends.

A number of refinements may be applied to the data processing method 1000 of FIG. 1. Examples follow: In some embodiments of the invention, the destination dataset may be committed to a particular destination site, typically such as a world wide web server site.

In other embodiments of the invention, post-processing of the destination dataset to generate a further dataset may be performed. For example this post-processing may be constrained to conform to a template of the destination site or to a format of the destination site.

In still other embodiments of the invention, the group of details may be established by selection from a catalog.

In still other embodiments of the invention, search criteria (FIG. 1, box 1060) may be graphically represented as rows, columns, and/or rectangular areas.

In still other embodiments of the invention, profile macros may be edited as part of the method. And in other embodiments of the invention, group(s) of details may be enumerated by the selecting of subset(s) of the matrix and the applying of edits iterated over a plurality of subsets.

In still other embodiments of the invention, post-processing may iterated for a plurality of destination sites.

Figure 2:
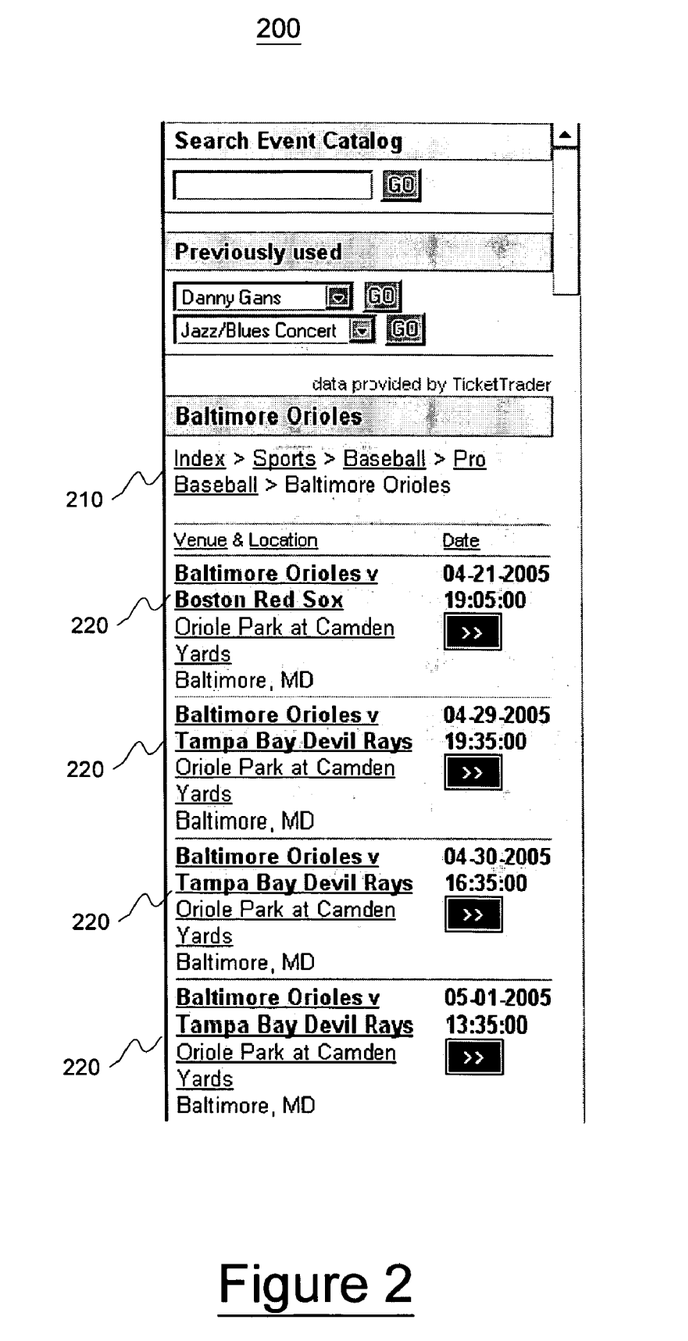
FIG. 2 is a partial screen shot showing groups within a visual image rendering of an electronic catalog according to an embodiment of the invention.

FIG. 2 is a partial screen shot 200 showing how groups, such as group of events with details, may be selected from a visual image rendering of an electronic catalog or similar. The items of these groups are not valuable merchantable items but represent abstractions of group characteristics and associated policies. An example of a policy might apply to merchantable firearms, which are not available to felons, minors or foreigners. In this example, the policy restricts, in some way, the merchantable item to qualified buyers. Policies are not hard and fast rules, another example is considerations to take into account when calculating estimated shipping charges or for how long a consideration may be offered for sale (for example there is little market for theatre seats after the relevant performance is history!).

Figure 3:
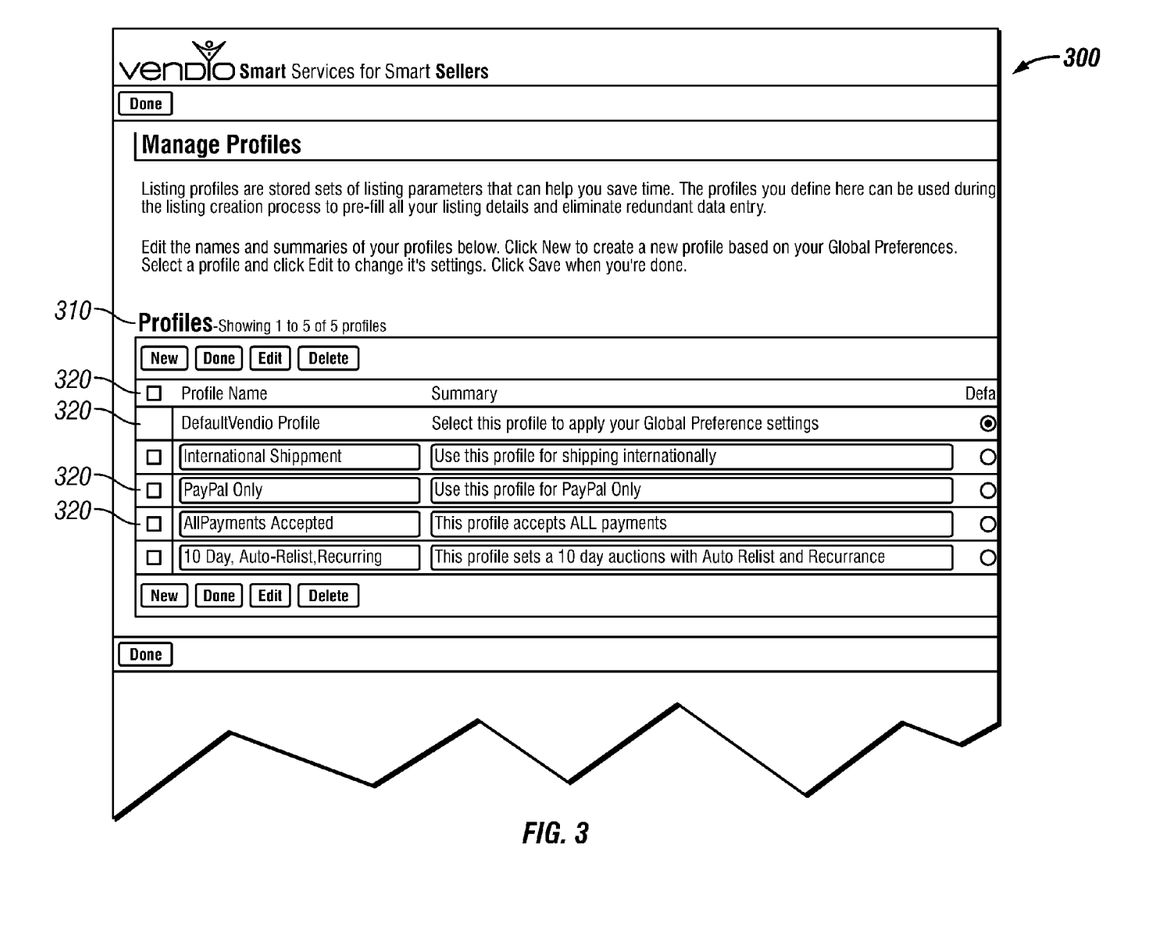
FIG. 3 is a partial screen shot showing selection from a list of profiles according to an embodiment of the invention.

FIG. 3 is a partial screen shot 300 showing an example of how to select profiles 320 (including profile macros) from a list of profiles 310.

Figure 4:
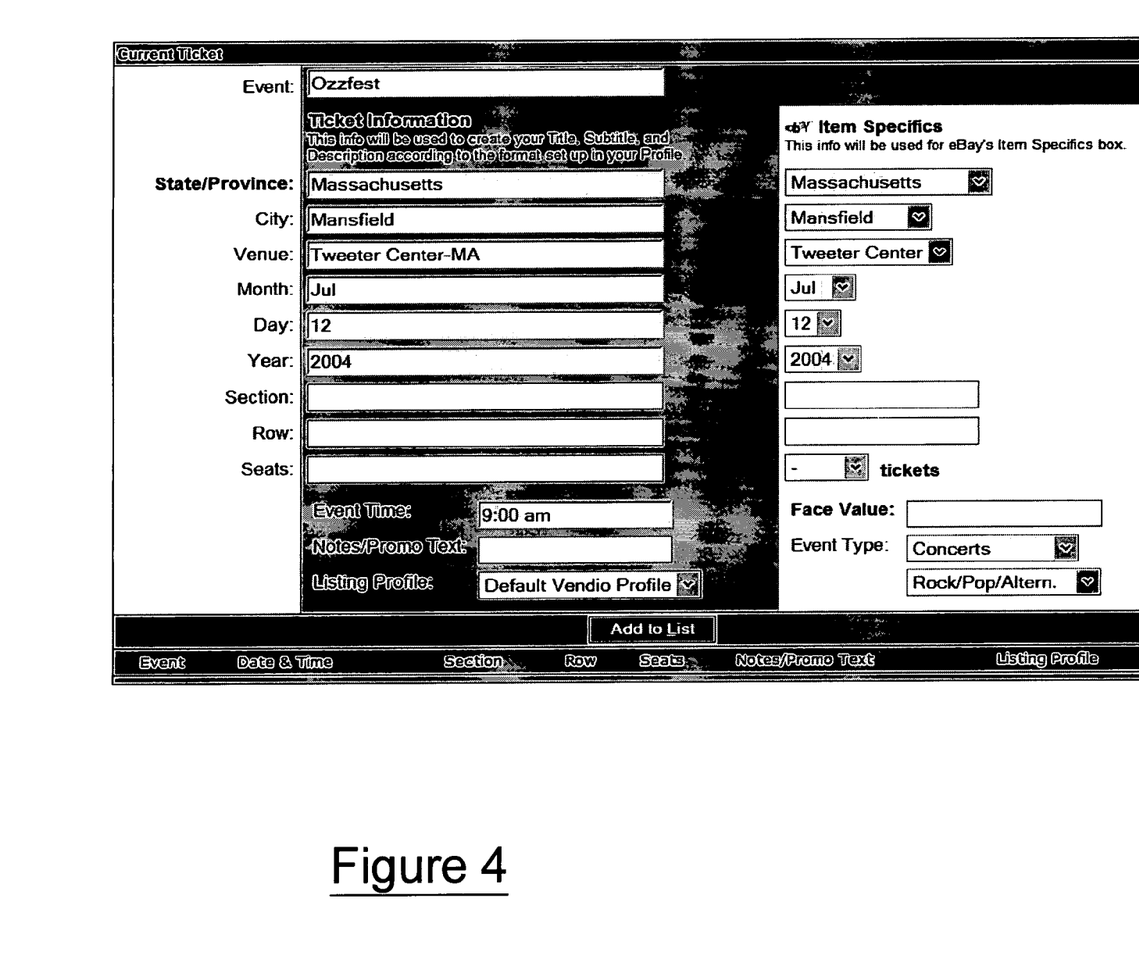
FIG. 4 is a partial screen shot showing an example of an established group of details according to an embodiment of the invention.

FIG. 4 is a partial screen shot showing an example of an established group of details. In this example, the groups of tickets for the exemplary "Ozzfest Concert" share the same date, time, venue, and hierarchical category information (potentially relevant for the marketplace in which the tickets will be auctioned). Flexibly accommodated are any type and number of attributes that might be common to a group of listings. For example, if the listing were for automobiles, the common attributes might include the venue for pickup, make, model or year.

Figure 5:
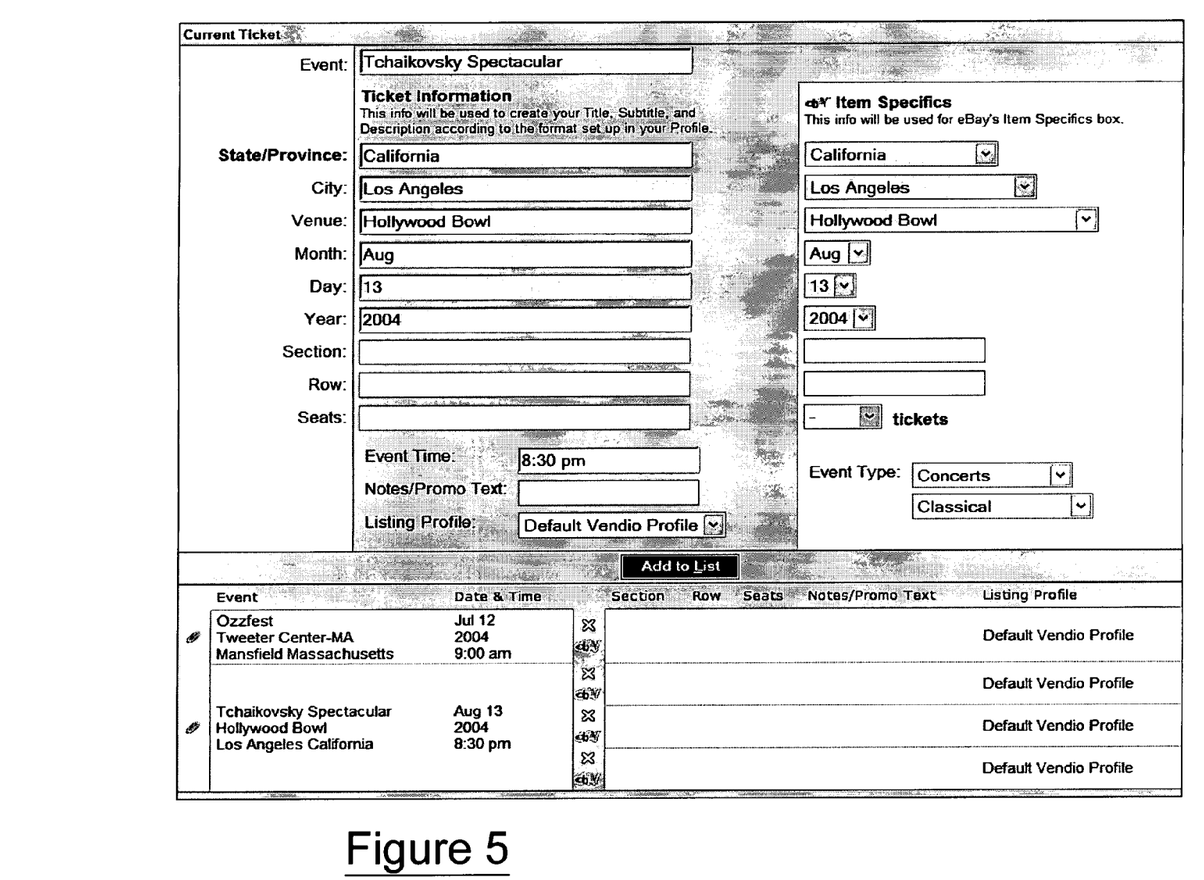
FIG. 5 shows a similar but more complex partial screen shot showing a further established group of details according to an embodiment of the invention.

FIG. 5 shows a similar but more complex partial screen shot showing a further established group of details. In this example, groups of tickets for the Tchaikovsky Spectacular each have the same date, time, venue, and hierarchical category information as the other Tchaikovsky Spectacular tickets. Though it appears that the exemplary matrices of FIGS. 4 and 5 may share the same policies they differ in regards to attributes.

Once the base attributes have been entered and a number of output items (e.g. listings) has been identified, embodiments of the inventive method may take base attributes and generate a matrix to elicit specific characteristics of each respective output item. FIG. 6 shows an exemplary matrix 600 with populated fields. The matrix of FIG. 6 shows one group of tickets for an Ozzfest concert and four groups of tickets for a Tchaikovsky Spectacular.

Figure 7:
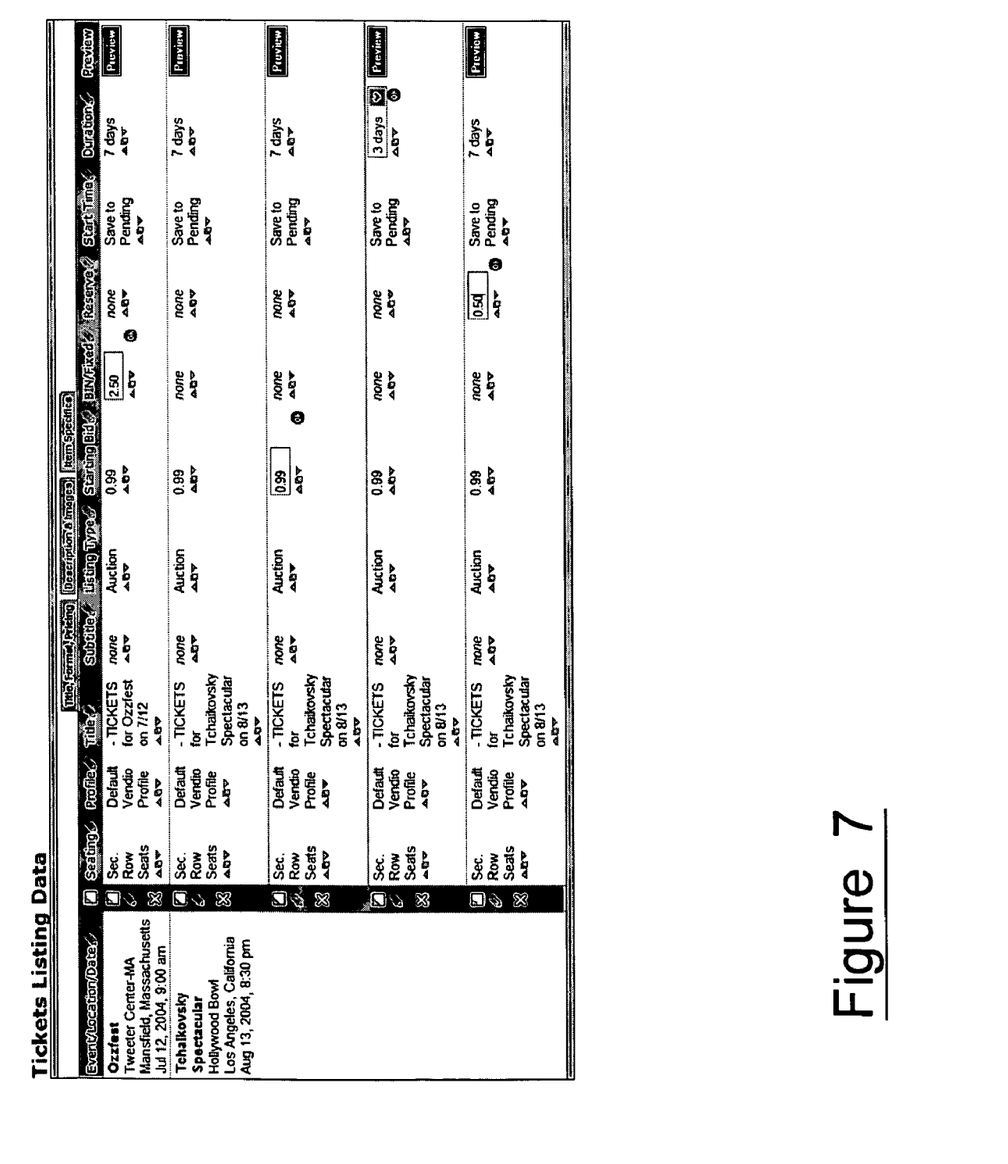
FIG. 7 is a partial screen shot showing the matrix of FIG. 6 after a bulk subset has been selected for editing.

FIG. 7 is a partial screen shot showing the matrix of FIG. 6 after a bulk subset has been selected for editing. In this example, the selected fields are highlighted by being enclosed in rectangular "boxes" drawn around the screen display of the respective fields. The method allows the bulk editing of the individual output item characteristics after the base attributes have been identified. The usage of bulk editing of these characteristics simplifies the editing process, makes it more efficient, and reduces potential errors. Moreover, it may allow error checking and convenient editing features like bulk copying as, for example, an entire column or subsets of a column. The method may allow editing of characteristics (e.g. pricing, times, or duration) for each of a number of output items (e.g. auction listings). In the example of FIG. 7, the fixed price attribute, starting bid, and auction duration, and reserve price are being customized for different groups of tickets.

The embodiments described above are exemplary rather than limiting and the bounds of the invention should be determined from the claims. Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A method operable over the internet for the bulk editing of electronically displayed descriptions of a plurality of merchantable items to generate a destination dataset for use by an ecommerce destination site comprising the acts of:

establishing at least one established group of details, each group of details including data associated with a commercial activity involving one or more of said merchantable items, each group of details also having a set of associated policies applicable to ecommerce in the merchantable items wherein the policy constrains the details involving the one or more merchantable items;

creating a user perceptible display of profiles on a computer display enabling selection and editing of said profiles by a user;

selecting at least one selected profile, wherein the profile is a characteristic associated with the commercial activity involving the one or more merchantable items, the selected profile having at least one profile macro;

creating on a computer display a human perceptible display in a matrix format comprising at least one aligned plurality of fields derived from the at least one established group of details regarding the commercial activity involving the one or more merchantable items;

populating the plurality of fields with data regarding the commercial activity involving the one or more merchantable items, the populating constrained by the at least one selected profile;

selecting a bulk subset of the matrix according to at least one search criterion by selecting one or more of the fields of said matrix; and applying a plurality of edits to a source dataset selected from the bulk subset to generate a destination dataset for use by an ecommerce destination site, wherein the edits are constrained by the set of associated policies.

2. The method of claim 1 further comprising the act of: committing the destination dataset to a destination site.

3. The method of claim 2 further comprising the act of: post-processing the destination dataset to generate a further dataset conforming to an entity selected from a list consisting of a template of the destination site and a format of the destination site.

4. The method of claim 3 wherein: the establishing comprises selecting from a catalog.

5. The method of claim 3 wherein: the at least one search criterion is selected from a list consisting of graphically represented rows, columns, and rectangular areas.

6. The method of claim 3 wherein the post processing is iterated for a plurality of destination sites.

7. The method of claim 1 further comprising the act of editing the at least one profile macro.

8. The method of claim 1 further comprising the act of enumerating the at least one group of details by iterated selection.

9. The method of claim 1 wherein the at least one profile consists of a plurality of profiles and the populating is in conformance with each respective profile of the plurality of profiles.

10. The method of claim 1 wherein the selecting of subset of the matrix and the applying of edits are iterated over a plurality of subsets.

11. The method of claim 1 wherein: the at least one search criterion is selected from a list consisting of graphically represented rows, columns, and rectangular areas.

12. A computer software product operable over the internet for the bulk editing of electronically displayed descriptions of a plurality of merchantable items to generate a destination dataset for use by an ecommerce destination site comprising at least one recordable medium, the recordable medium having computer instruction codes recorded thereon, the computer instruction codes operable to perform the acts of:

establishing at least one established group of details, each group of details are data associated with a commercial activity involving one or more of said merchantable items, each group of details also having a set of associated policies applicable to ecommerce in the merchantable items, wherein the policy constrains the details involving the one or more merchantable items;

each group of details also having a set of associated policies applicable to ecommerce in the merchantable items wherein the policy constrains the details involving the one or more merchantable items creating a user perceptible display of profiles on a computer display enabling selection and editing of said profiles by a user;

selecting at least one selected profile, wherein the profile is a characteristic associated with the commercial activity involving the one or more merchantable items, the selected profile having at least one profile macro;

creating a user perceptible display of profiles on a computer display enabling selection and editing of said profiles by a user;

selecting at least one selected profile, wherein the profile is a characteristic associated with the commercial activity involving at least one of said merchantable items, the selected profile having at least one profile macro;

creating on a computer display a human perceptible display in a matrix format comprising at least one aligned a plurality of fields derived from the at least one established group of details regarding the commercial activity involving the one or more merchantable items;

populating the plurality of fields with data regarding the commercial activity involving the one or more merchantable items, the populating constrained by the at least one selected profile;

selecting a bulk subset of the matrix according to at least one search criterion by selecting one or more of the fields of said matrix; and applying a plurality of edits to a source dataset selected from the bulk subset to generate a destination dataset for use by an ecommerce destination site, wherein the edits are constrained by the set of associated policies.

13. The computer software product of claim 12 wherein the computer instruction codes are further operable to perform the act of: committing the destination dataset to a destination site.

14. The computer software product of claim 13 wherein the computer instruction codes are further operable to perform the act of: post-processing the destination dataset to generate a further dataset conforming to an entity selected from a list consisting of a template of the destination site and a format of the destination site.

15. The computer software product of claim 14 wherein: the establishing comprises selecting from a catalog.

16. The computer software product of claim 14 wherein: the at least one search criterion is selected from a list consisting of graphically represented rows, columns, and rectangular areas.

17. The computer software product of claim 14 wherein the post processing is iterated for a plurality of destination sites.

18. The computer software product of claim 12 wherein the computer instruction codes are further operable to perform the act of: editing the at least one profile macro.

19. The computer software product of claim 12 wherein the computer instruction codes are further operable to perform the act of: enumerating the at least one group of details by iterated selection.

20. The computer software product of claim 12 wherein the at least one profile consists of a plurality of profiles and the populating is in conformance with each respective profile of the plurality of profiles.

21. The computer software product of claim 12 wherein the selecting of subset of the matrix and the applying of edits are iterated over a plurality of subsets.

22. The computer software product of claim 12 wherein: the at least one search criterion is selected from a list consisting of graphically represented rows, columns, and rectangular areas.

* * * * *